Figure 1:
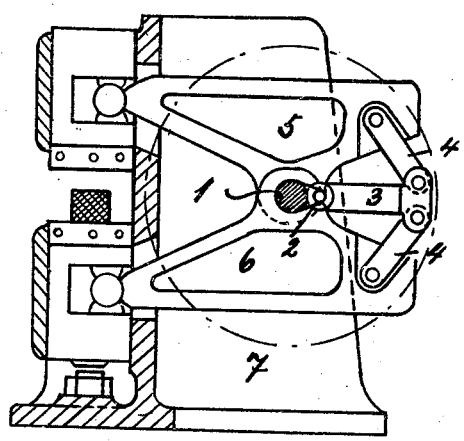

Oct. 2, 1928.

A. NOLL 1,686,392

SHEARS FOR CUTTING BLOCKS OR BARS

Filed Dec. 31, 1924

Inventor
a. Nöll:
by
Attorney.

Patented Oct. 2, 1928.

1,686,392

UNITED STATES PATENT OFFICE.

ALBERT NÖLL, OF DUISBURG, GERMANY.

SHEARS FOR CUTTING BLOCKS OR BARS.

Application filed December 31, 1924, Serial No. 759,066, and in Germany January 19, 1924.

The present invention relates to shears for cutting metal blocks and bars of the type in which two cutters are provided to move in opposite directions, the upper cutter first moving downwardly and coming to rest upon the work to be cut, the lower cutter then effecting the cutting operation by movement in the upward direction.

The present invention has among its objects to overcome the disadvantages of the type of shears referred to by providing the levers which operate the cutters or cutter guide blocks, upon a common shaft which is mounted in fixed position in the standard or frame of the shears whereby the stresses imposed in the cutting operation are not transmitted to the frame.

The lever shaft advantageously serves at the same time as the driving crank shaft, one or more cranks being provided upon the shaft and effecting the alternate movements of the upper and lower cutter levers by means of a toggle-lever system or the like.

By this means the vertical stresses arising from the cutting pressure and exerted on the crank shaft are balanced, and thus the standard or frame of the shears is completely relieved of the effect of these stresses. Moreover, as the moving parts can be maintained very small, the necessarily great stresses hitherto involved in shears of the type specified are reduced to a minimum, and the number of strokes in the upward direction can be varied within wide limits. Furthermore, the cost of production is very considerably reduced by reason of the great saving in weight secured in the apparatus according to the invention.

An apparatus according to the invention is illustrated diagrammatically in the drawings by way of example, the shears being provided with a knee-lever system disposed to the right of the driving shaft.

Figure 3:
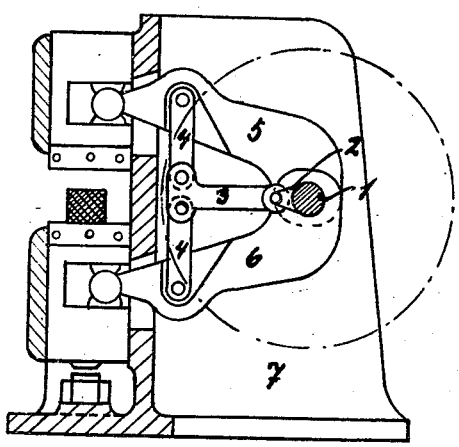
Figure 2:
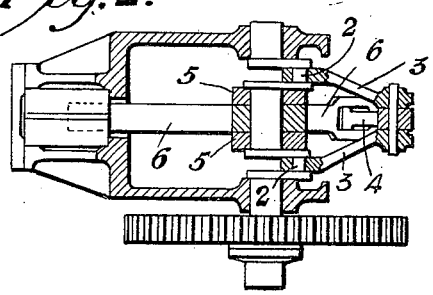

The invention is illustrated diagrammatically in the accompanying drawings in which Figure 1 represents in partial elevation, partly in section shears constructed according to the invention, Figure 2 illustrates a plan view partly in section corresponding to Figure 1, and Figure 3 is an elevation partly in section of a constructional modification.

In Figures 1 and 3 of the accompanying drawing, 1 represents the crank shaft which is mounted in fixed position in the standard or frame 7 and upon which cranks 2 are provided. Connecting or tension rods 3 are pivotally connected to the cranks 2 and at one end and to a toggle-lever system 4 at the other. The toggle-lever system transmits movement to the levers 5 and 6, which are pivotally mounted upon the crank shaft 1. The upper and lower cutters are mounted on these levers in suitable vertical guides.

The operation of the shears will be readily understood.

The crank shaft 1 is driven in any desired manner and the cranks 2 rotate with it. The cranks draw the toggle-lever system into the extended position illustrated in Figure 1 by means of the connecting rod 3, and thereby move the levers 5 and 6 about their axes of rotation upon the crank shaft 1. This causes the upper and lower cutters to move in the vertical guides in opposite directions, and thus the blocks or bars are cut.

It will be understood that the shears may as illustrated in Figure 3 be constructed in such manner that the connecting rod 3 and the toggle-lever system are disposed to the left of the crank shaft 1.

I claim:

1. In block and bar shears of the kind in which the cutters have a rectilinear movement in opposite directions to cut the blocks or bars, the combination of two cutters adapted to have a rectilinear movement imparted to them, two levers to adjacent ends of which respectively the cutters are connected, a common shaft upon which the said levers are mounted to have movement on a common axis, and toggle lever mechanism for imparting movement to the said levers, substantially as described.

2. In block and bar shears of the kind in which the cutters move in opposite directions to cut the blocks or bars, the combination of two cutters, levers to adjacent ends of which respectively the cutters are connected, a common shaft upon which the said levers are mounted, and mechanism operating on the rotation of the said shaft to cause the movement of the said levers, substantially as described.

3. In block and bar shears of the kind in which the cutters move in opposite directions to cut the blocks or bars, the combination of two cutters, levers to adjacent ends of which respectively the cutters are connected, a common shaft upon which the said levers are mounted, and mechanism comprising cranks upon the said shaft for imparting movement to the said levers, substantially as described.

4. In block and bar shears of the kind in which the cutters move in opposite directions to cut the blocks or bars, the combination of two cutters, levers to adjacent ends of which respectively the cutters are connected, a common shaft upon which the said levers are mounted, toggle lever mechanism for imparting movement to the said levers at adjacent ends thereof, and cranks upon the said shaft from which the said toggle lever mechanism is operated, substantially as described.

ALBERT NÖLL.